United States Patent
Choi et al.

(10) Patent No.: US 10,416,824 B2
(45) Date of Patent: Sep. 17, 2019

(54) CAPACITANCE DETECTION DEVICE AND DRIVING METHOD OF THE SAME

(71) Applicant: ANAPASS INC., Seoul (KR)

(72) Inventors: Woo Seok Choi, Seoul (KR); Young Hwan Kang, Seoul (KR)

(73) Assignee: ANAPASS INC., Seoul (KR)

( * ) Notice: Subject to any disclaimer, the term of this patent is extended or adjusted under 35 U.S.C. 154(b) by 65 days.

(21) Appl. No.: 15/872,503

(22) Filed: Jan. 16, 2018

(65) Prior Publication Data

US 2018/0232078 A1  Aug. 16, 2018

(30) Foreign Application Priority Data

Feb. 14, 2017  (KR) .......... 10-2017-0020076

(51) Int. Cl.
   *G06F 3/044* (2006.01)
   *G06F 3/041* (2006.01)
   *G09G 3/36* (2006.01)

(52) U.S. Cl.
   CPC .......... *G06F 3/044* (2013.01); *G06F 3/0412* (2013.01); *G06F 3/0418* (2013.01); *G06F 2203/04112* (2013.01); *G09G 3/36* (2013.01); *G09G 2310/0264* (2013.01)

(58) Field of Classification Search
   None
   See application file for complete search history.

(56) References Cited

U.S. PATENT DOCUMENTS

| | | | | |
|---|---|---|---|---|
| 7,920,129 B2* | 4/2011 | Hotelling | ............... | G06F 3/0416 345/173 |
| 8,736,563 B2* | 5/2014 | Noguchi | ............... | G06F 3/0412 178/18.02 |
| 2012/0293447 A1* | 11/2012 | Heng | ...................... | G06F 3/044 345/174 |
| 2013/0154992 A1* | 6/2013 | Nascimento | ............ | G06F 3/044 345/174 |
| 2014/0132525 A1* | 5/2014 | Pyo | ...................... | G06F 3/0412 345/173 |
| 2015/0309614 A1* | 10/2015 | Waldron | .................. | G06F 3/044 345/174 |
| 2015/0331540 A1* | 11/2015 | Lee | ...................... | G06F 3/0416 345/174 |
| 2016/0062494 A1* | 3/2016 | Zuber | .................. | G06F 3/0418 345/173 |

FOREIGN PATENT DOCUMENTS

| KR | 20130124868 A | 11/2013 |
|---|---|---|
| KR | 101387146 B1 | 5/2014 |
| KR | 20140072804 A | 6/2014 |

* cited by examiner

*Primary Examiner* — Duane N Taylor, Jr.
(74) *Attorney, Agent, or Firm* — Yakov S. Sidorin; Quarles & Brady LLP

(57) ABSTRACT

Provided are a capacitance-detection device and a driving method for the same. The driving method includes acquiring a noise signal, comparing a magnitude of the acquired noise signal and a threshold value for driving a capacitance-detection device, and adjusting a driving signal provided to a capacitance-detection device to be driven according to a comparison result.

13 Claims, 8 Drawing Sheets

CAPACITANCE DETECTION DEVICE AND DRIVING METHOD OF THE SAME

CROSS-REFERENCE TO RELATED APPLICATIONS

This application claims priority from and the benefit of Korean Patent Application No. 10-2017-0020076, filed on Feb. 14, 2017, the disclosure of which is incorporated herein by reference in its entirety.

BACKGROUND

1. Field of the Invention

The present invention relates to a capacitance-detection device and a driving method of the same.

2. Discussion of Related Art

Sensing methods configured to detect touch are mainly based on resistive sensing, surface ultrasonic sensing, and capacitive sensing. Capacitive sensing methodology enables multi-touch sensing and has excellent durability, visibility, and the like. Therefore, capacitive sensing is being increasingly adopted as a main input means for portable mobile devices.

A capacitive capacitance-detection device is configured to sense or detect, in operation, a change in amount of charge caused by the user's interference with a capacitive sensor (via, for example, a touch-screen patent), thereby recognizing the user's input. According to charge accumulation methods, capacitive capacitance-detection devices are classified into a self-capacitive type and a mutual-capacitive type. In a self-capacitive capacitance-detection device, each capacitive sensor includes one conductor to form a reference ground and an electrified surface outside a touch screen panel. On the other hand, in the mutual-capacitive capacitance-detection device (such as a touch screen), two conductors on a touch screen panel function as one capacitive sensor.

In a general self-capacitive capacitance-detection device, an orthogonal X/Y conductor disposition is used. In this case, each capacitive sensor functions as a line sensor, and thus upon each touch screen sensing, such capacitive sensor receives only one portion of X-sensing information and one portion of Y-sensing information from an X-line sensor group and a Y-line sensor group, respectively. Therefore, a general self-capacitive touch screen is configured to be capable of sensing and tracking a single touch but cannot support performance involving multiple touches.

In a mutual-capacitive capacitance-detection device, the orthogonal X/Y conductor disposition is used as well. However, the mutual-capacitive capacitance-detection device differs from the self-capacitive capacitance-detection device in that each capacitive sensor in the former is configured as a grid sensor at each position where conductors cross each other at right angles, and reactions of all grid sensors are separately sensed upon detection of a user input on a touch screen. Since grid sensors correspond to different pairs of X/Y coordinates on a one-to-one basis and provide independent reactions to inputs, a mutual-capacitive touch screen may be used to sense and track multiple touches of a user by extracting user input information from a set of X/Y-sensing information received from a set of X/Y grid sensors.

A conductor configuration of and a sensing method carried out by a general mutual-capacitive touch screen panel are as follows. First electrodes (composed of conductors extending in one direction) and second electrodes (composed of conductors extending in a direction perpendicular to that of the first electrodes) form mutual-capacitive sensors, with the use of a dielectric material between the first and second electrodes as a medium. When the distance between first and second electrodes of each pair is d, the area of each surface is a, and the equivalent permittivity of all dielectric materials between electrified surfaces is $\varepsilon$, a capacitance C of each of the sensors is defined as $C=\varepsilon*a/d$ and has a relationship with an amount Q of charge accumulated in the sensor and a potential difference (voltage) V applied to the two electrodes/electrified surfaces, via $Q=CV$. When a user approaches such a sensor, interference occurs in an electric field formed between the two electrodes and hinders charge from being accumulated in the sensor. Then, the amount of charge accumulated in the sensor is reduced, and as a result, the capacitance of the sensor is reduced. This may be understood and/or viewed as a change of the capacitance resulting from a change in the equivalent permittivity between electrified surfaces caused by the approach of the user, but there is actually a physical phenomenon that a part of an electric field between the electrified surfaces is shunted and thus the amount of electrification/accumulated charge is reduced. When an alternating current (AC) voltage source is connected to the first electrode and an AC waveform is applied to one electrified surface of the sensor, a change $\Delta Q$ in the amount of electrification corresponding to $\Delta Q = C\Delta V$ occurs with respect to C that varies according to the degree of approach of the user, and that is converted into a current or voltage by a read-out circuit connected to the second electrode. Information converted in this way is generally subjected to signal processing operations (such as noise filtering, demodulation, analog-to-digital conversion, accumulation, and the like), and then is used in a coordinate-tracking algorithm and a gesture-recognition algorithm. As a preceding patent relating to such a capacitive touch-sensitive panel, there is U.S. Pat. No. 7,920,129.

SUMMARY OF THE INVENTION

Capacitance-detection devices are used in various fields, such as a portable phone, a tablet, a portable personal computer (PC), and the like. As a user, who carries a capacitance-detection device, moves, the capacitance-detection device operates in various environments. Therefore, the capacitance-detection device is affected by noise coming from an environment thereof, and accordingly detection of an input provided by the user is affected.

The present embodiments are directed to providing a capacitance-detection device and a driving method of the same, which make it possible to reduce influence of noise whereby detection of a user's input is affected.

According to an embodiment of the present invention, there is provided a driving method for a capacitance-detection device, the method including: acquiring a noise signal; comparing a magnitude of such acquired noise signal and a threshold value for driving a capacitance-detection device; and adjusting a driving signal provided to a capacitance-detection device to be driven according to a result of such comparison.

Another embodiment of the present invention provides a capacitance-detection device including: a capacitance-detection panel containing driving electrodes and sensing electrodes; a driving circuit configured to provide a driving signal to the driving electrodes and to receive a capacitance-detection signal from the sensing electrodes; and a noise-detection probe configured to detect and provide noise to the driving circuit. The driving circuit adjusts the driving signal according to a magnitude of the detected noise.

BRIEF DESCRIPTION OF THE DRAWINGS

The above and other objects, features and advantages of the present invention will become more apparent to those of ordinary skill in the art by describing in detail embodiments thereof with reference to the accompanying drawings, in which.

DETAILED DESCRIPTION

Figure 1:
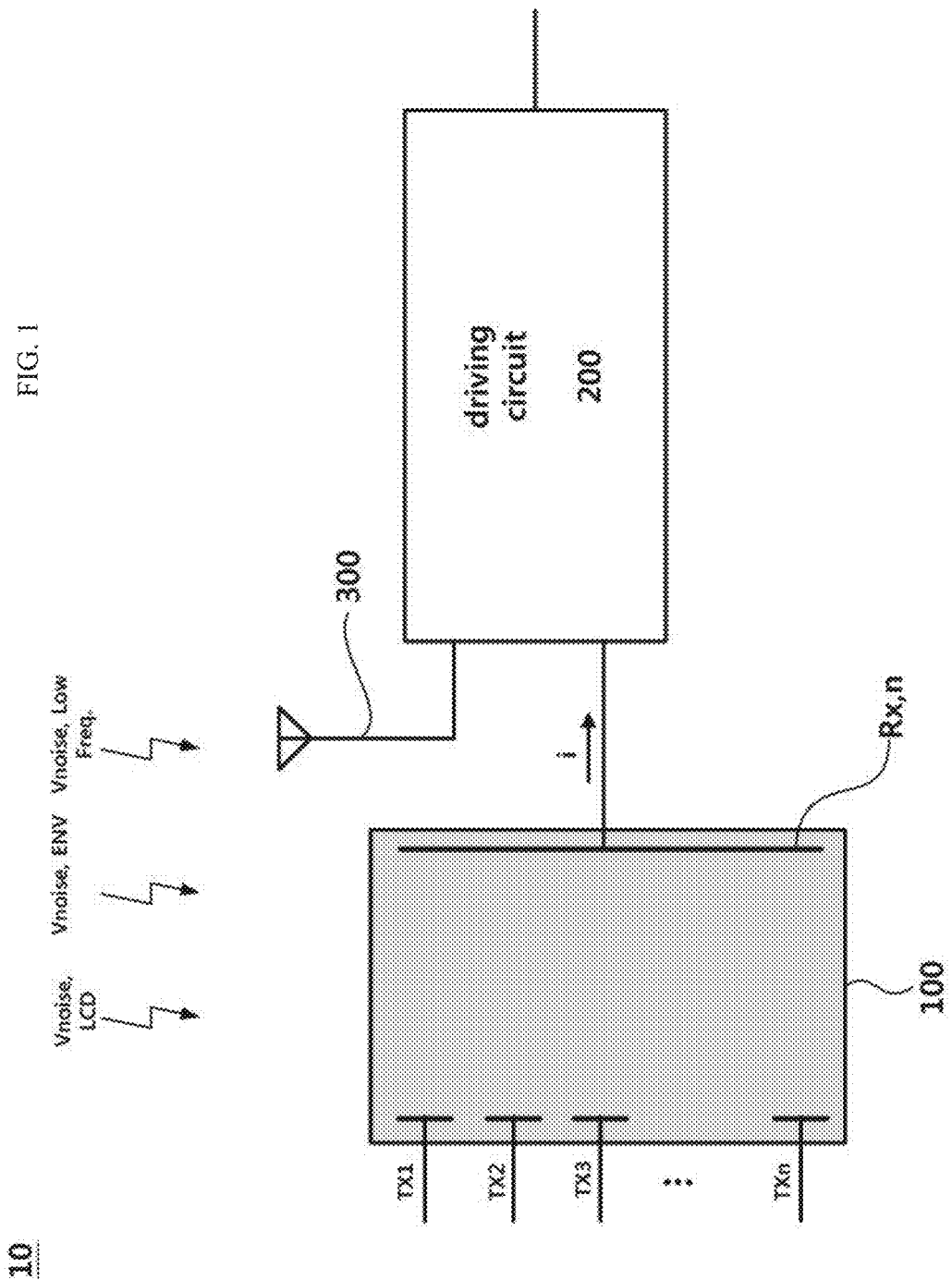
FIG. 1 is a schematic diagram showing a summary of a capacitance-detection device according to the present embodiment.

Hereinafter, a capacitance-detection device and a driving method for the same according to the present embodiment will be described in detail with reference to the accompanying drawings. FIG. 1 is a schematic diagram summarizing a capacitance-detection device 10 according to the present embodiment. Referring to FIG. 1, the capacitance-detection device 10 includes a capacitance-detection panel 100 including driving electrodes Tx1, Tx2, . . . , and Txn and sensing electrodes Rx1, Rx2, . . . , and Rxn (see FIG. 3), a driving circuit 200 that provides a driving signal to the driving electrodes and receives a capacitance-detection signal from the sensing electrodes, and a noise-detection probe 300 which detects and provides noise to the driving circuit. The driving circuit 200 adjusts the driving signal according to a magnitude of the detected noise.

In the embodiment shown as an example in FIG. 1, the noise-detection probe 300 is configured to detect noise $Vnoise_{LCD}$ (coming from a liquid crystal display (LCD) to the capacitance-detection device 10), noise $Vnoise_{ENV}$ (coming from an environment in which the capacitance-detection device 10 is located), and low-frequency noise $Vnoise_{Low\ Freq.}$ (coming from a power source and the like), and to provide a signal corresponding to the detected noise to the driving circuit 200.

Figure 2:
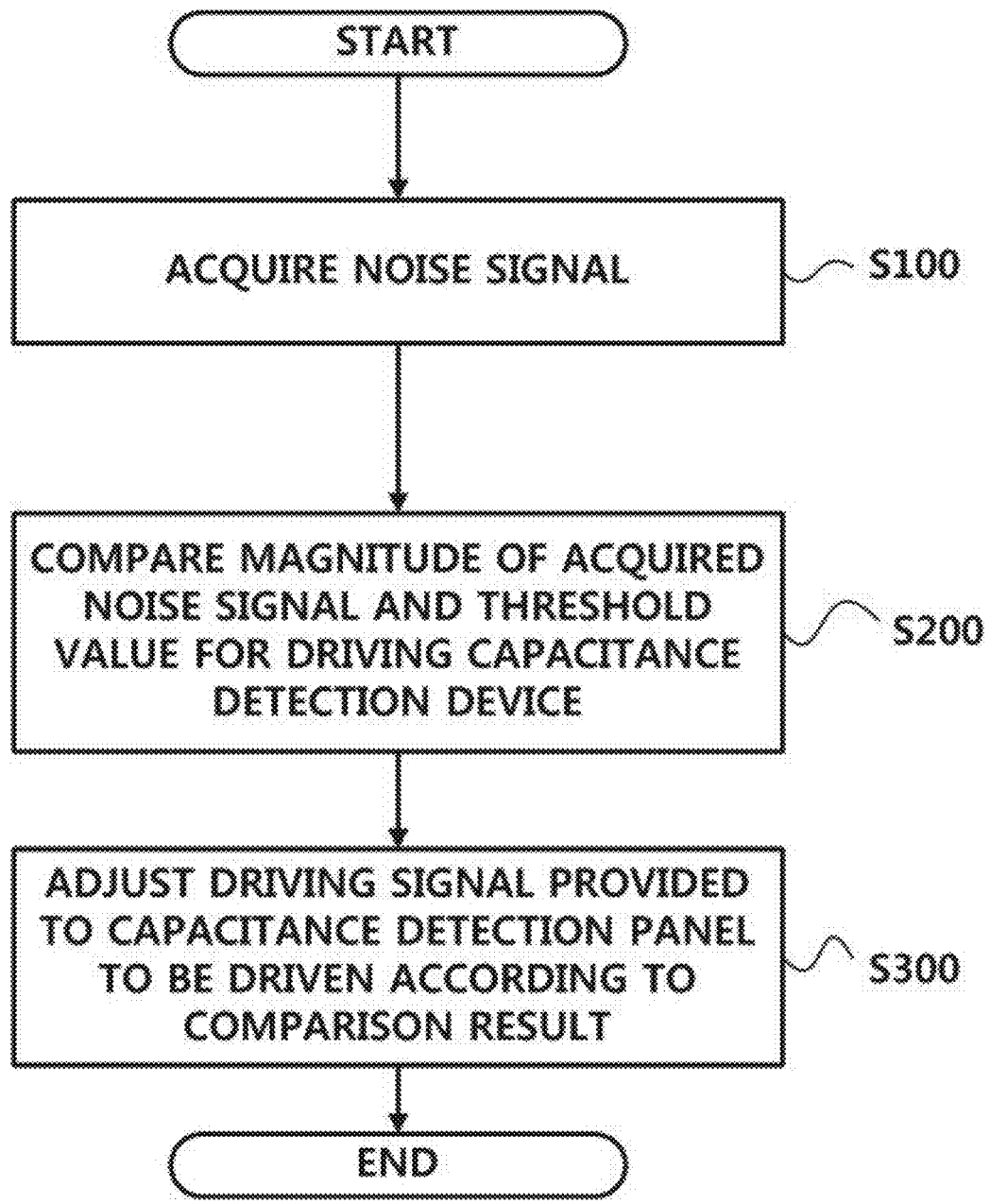
FIG. 2 is a flowchart illustrating a summary of a capacitance-detection method according to the present embodiment.

FIG. 2 is a flowchart illustrating a capacitance-detection method according to the present embodiment. Referring to FIG. 2, a driving method for a capacitance-detection device according to the present embodiment includes: acquiring a noise signal (S100), comparing a magnitude of the acquired noise signal and a threshold value for driving a capacitance-detection device (S200), and adjusting a driving signal provided to a capacitance-detection device to be driven according to a result of such comparison (S300).

Figure 3A:
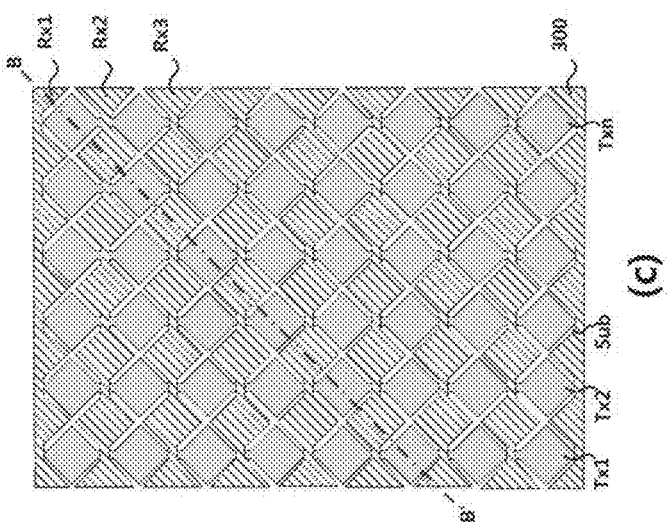
FIG. 3(A) is a diagram showing a summary of a configuration of a capacitance-detection panel according to an embodiment.
Figure 3B:
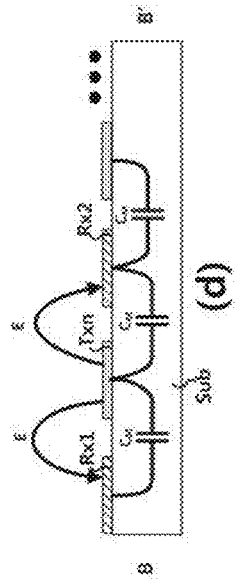
FIG. 3(B) is a diagram schematically showing provision of a driving signal to a driving electrode according to the embodiment.
Figure 3C:
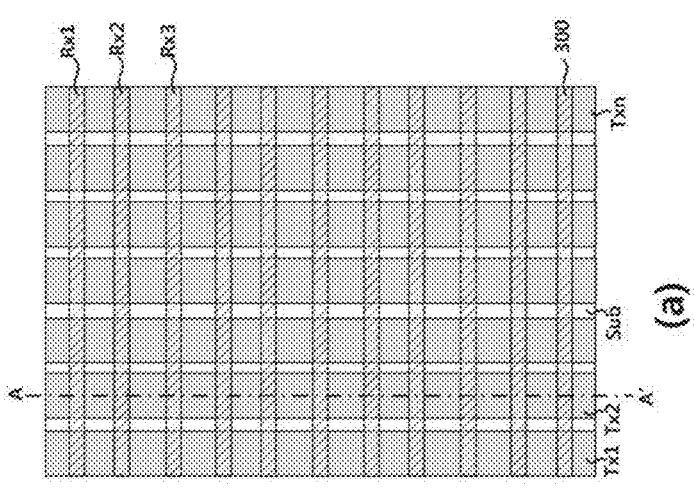
FIG. 3(C) is a diagram showing a summary of a configuration of a capacitance-detection panel according to another embodiment.
Figure 3D:
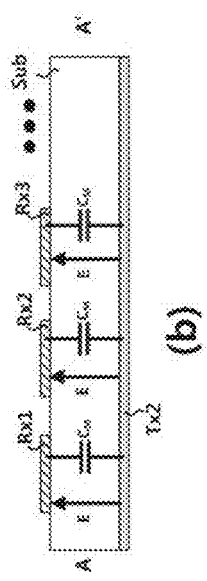
FIG. 3(D) is a diagram schematically showing provision of a driving signal to a driving electrode according to the other embodiment.

FIG. 3(A) is a diagram summarizing a configuration of the capacitance-detection panel 100 according to an embodiment, and FIG. 3(B) is a diagram schematically showing how a driving signal is provided to a driving electrode according to such embodiment. FIG. 3(C) is a diagram summarizing a configuration of the capacitance-detection panel 100 according to another related embodiment, and FIG. 3(D) is a diagram schematically showing how a driving signal is provided to a driving electrode according to such related embodiment. Referring to FIG. 3(A), the capacitance-detection panel 100 includes a substrate Sub, a plurality of driving electrodes Tx1, Tx2, . . . , and Txn disposed on one side of the substrate Sub, and a plurality of sensing electrodes Rx1, Rx2, . . . , and Rxn disposed on the other side of the substrate Sub.

In FIG. 3(A), the capacitance-detection panel 100 may further include a noise-detection probe 300. In the embodiment, the noise-detection probe 300 may be any one of a driving electrode and a sensing electrode formed in the capacitance-detection panel 100. The noise-detection probe 300, in operation, detects noise and generates and provides a noise signal (corresponding to the detected noise) to the driving circuit 200.

Referring to FIG. 3(B), the driving electrodes Tx1, Tx2, . . . , and Txn formed on the one side of the substrate Sub form capacitors with the sensing electrodes Rx1, Rx2, . . . , and Rxn at intersections, and the capacitors are referred to as mutual capacitances Cm. In other words, the driving electrodes are one electrodes of the capacitors, and the sensing electrodes are the other electrodes thereof. A driving signal is provided to a driving electrode such that electric fields E are formed between the driving electrode and the sensing electrodes. The space, in which the electric fields are formed, corresponds to a dielectric material of the capacitances. FIG. 3(B) schematically shows that a driving signal is provided to Tx2 such that electric fields are formed between Tx2 and the crossing sensing electrodes Rx1, Rx2, . . . , and Rxn and mutual capacitors $C_M$ are formed.

FIG. 3(C) schematically shows an embodiment of a panel, in which driving electrodes Tx1, Tx2, . . . , and Txn and sensing electrodes Rx1, Rx2, . . . , and Rxn are disposed on the same side of the substrate Sub. Each driving electrode includes diamond patterns and connection lines which connect the diamond patterns, and each sensing electrode includes diamond patterns and connection lines which connect the diamond patterns. The diamond patterns of the driving electrodes and the diamond patterns of the sensing electrodes do not come into contact with each other, and an insulating material is interposed between the connection lines of the driving electrodes and the connection lines of the sensing electrodes so that the connection lines of the driving electrodes and the connection lines of the sensing electrodes are not short-circuited.

In the embodiment shown in FIG. 3(C), the capacitance-detection panel 100 may further include a noise-detection probe 300. In the embodiment, the noise-detection probe 300 may be any one of a driving electrode and a sensing electrode formed in the capacitance-detection panel 100. The noise-detection probe 300 detects noise and generates and provides a noise signal corresponding to the detected noise to the driving circuit 200.

Referring to FIG. 3(D) which is a cross-sectional view of the panel of FIG. 3(C) taken along line B-B', when a driving signal is applied to a driving electrode Txn, each diamond of the driving electrode forms an electric field with an adjacent sensing electrode, and accordingly forms a mutual capacitance $C_M$. FIG. 3(D) shows that Txn forms mutual capacitances with sensing electrodes Rx1 and Rx2.

Figure 4:
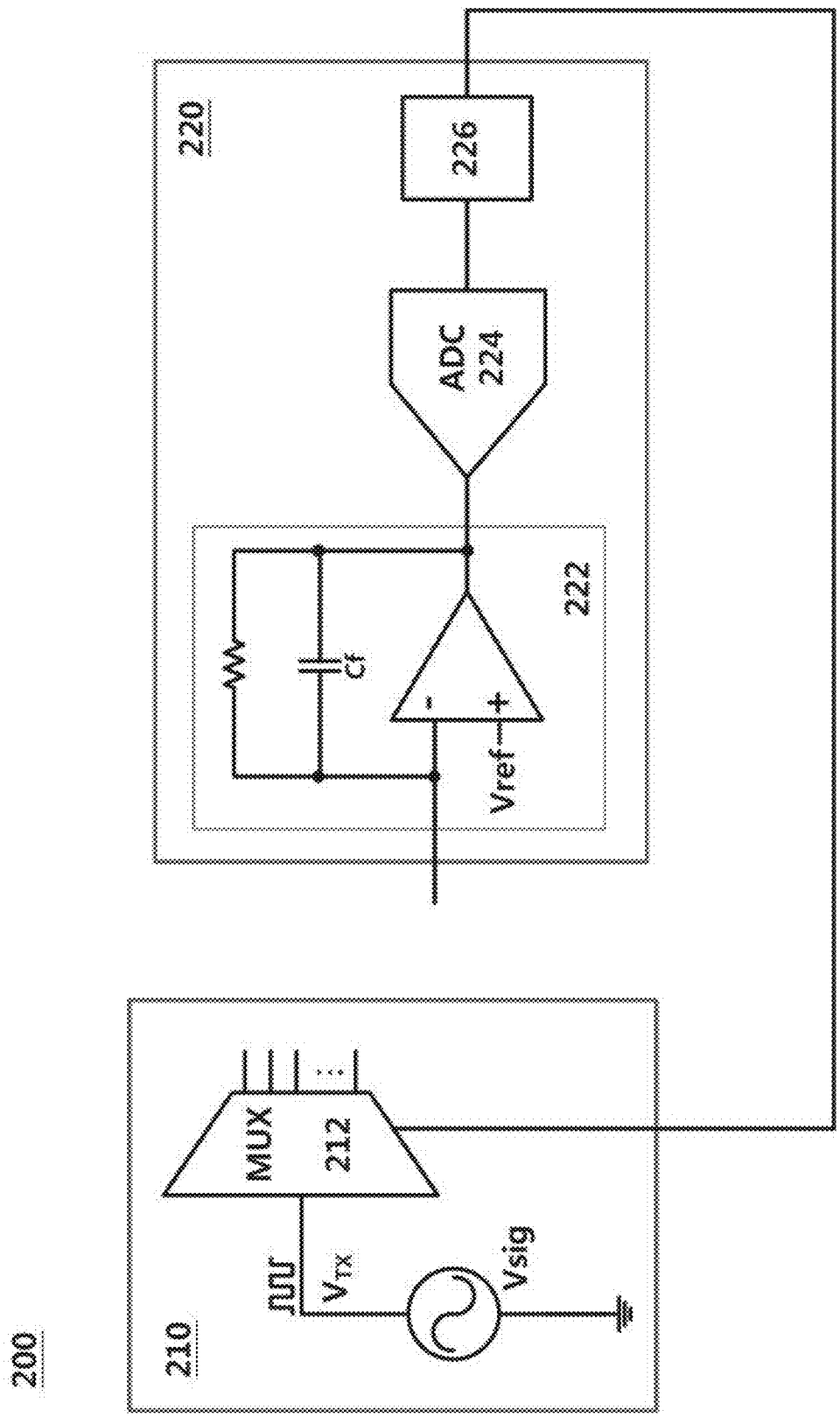
FIG. 4 is a block diagram showing a summary of a driving circuit.

FIG. 4 is a block diagram showing a summary of the driving circuit 200. Referring to FIG. 4, the driving circuit 200 includes a driving signal provider 210 including a signal source Vsig which provides a driving signal to the capacitance-detection panel 100, and a driving controller 220 which receives a noise signal collected by the noise-detection probe 300, compares the noise signal and a threshold value for driving a capacitance-detection device, and determines a driving signal $V_{TX}$ and a driving electrode to which the driving signal $V_{TX}$ is provided.

In an embodiment, the driving signal provider 210 includes the signal source Vsig which generates the driving signal $V_{TX}$, and a multiplexer (MUX) 212 which multiplexes the provided driving signal and provides the multiplexed driving signal to a driving electrode of the capacitance-detection panel 100 (see FIG. 1).

In an embodiment, the driving controller 220 includes a charge amplifier 222, which is operation receives and amplifies a noise signal provided by the noise-detection probe 300, an analog-to-digital converter (ADC) 224 configured to convert a signal provided by the charge amplifier 222 into a digital signal, and a controller 226 that is operation receives the digitized noise signal, compares the digitized noise signal with the threshold value for driving a capacitance-detection device, and controls a driving signal provided to the capacitance-detection panel 100.

Figure 5:
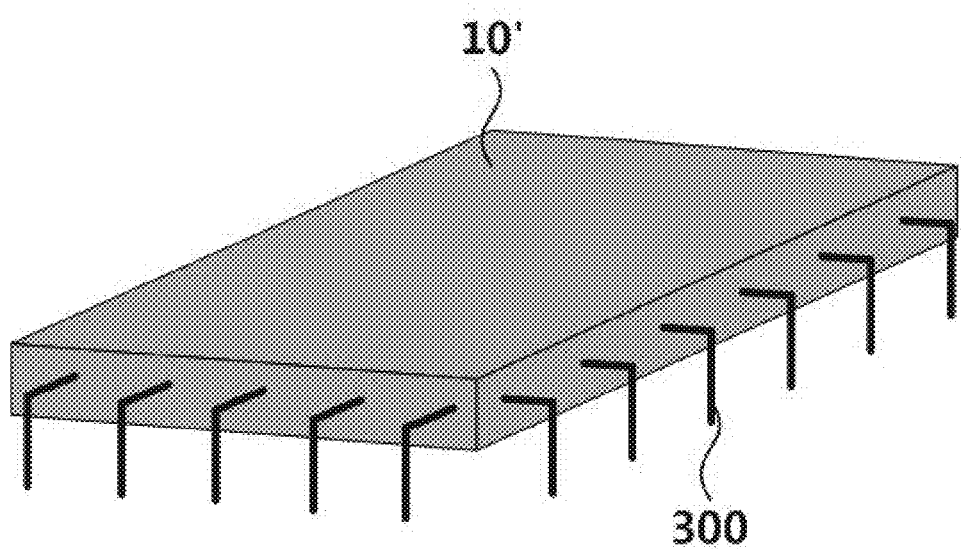
FIG. 5 is a schematic diagram showing an example of a noise-detection probe.

FIG. 5 is a schematic diagram showing an example of the noise-detection probe 300. Referring to FIG. 5, the capacitance-detection device 10 according to the present embodiment may be implemented in the form of an integrated circuit (IC) 10', and the noise-detection probe 300 may be a pin of the IC 10'.

As an example, the pin which functions as the noise-detection probe 300 is in an electrically floating state and functions as an antenna which collects noise. As another example, a reference voltage which is provided to the IC 10' is provided to the pin functioning as the noise-detection probe 300 such that inflowing noise may be detected through the reference voltage. As another example, the noise-detection probe 300 may be any one of a driving electrode and a sensing electrode of a capacitance-detection panel (see FIG. 3) as described above.

Figure 6:
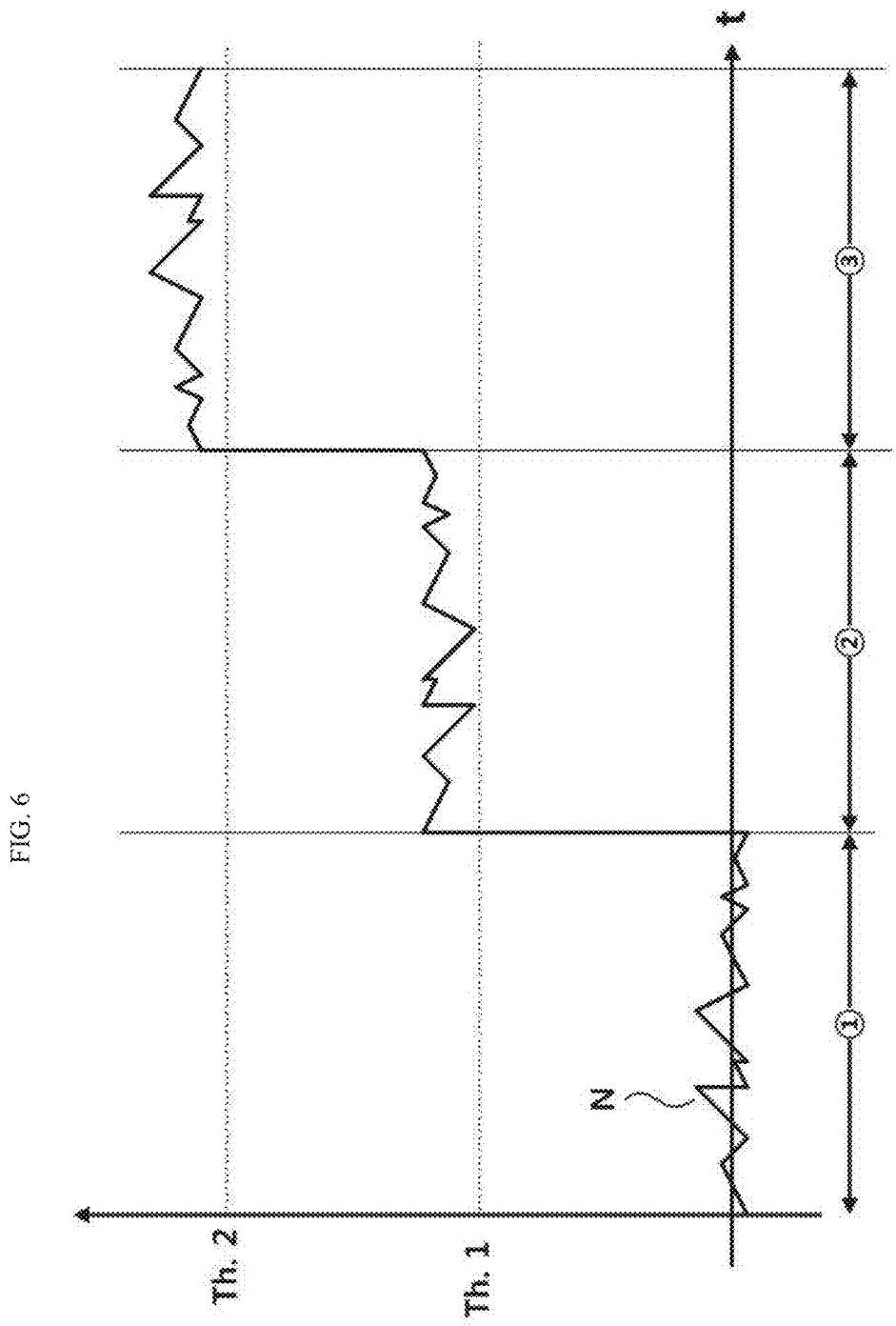
FIG. 6 is a diagram exemplifying changes in the magnitude of a noise signal detected by a noise probe over time in relation to a plurality of threshold values.
Figure 7:
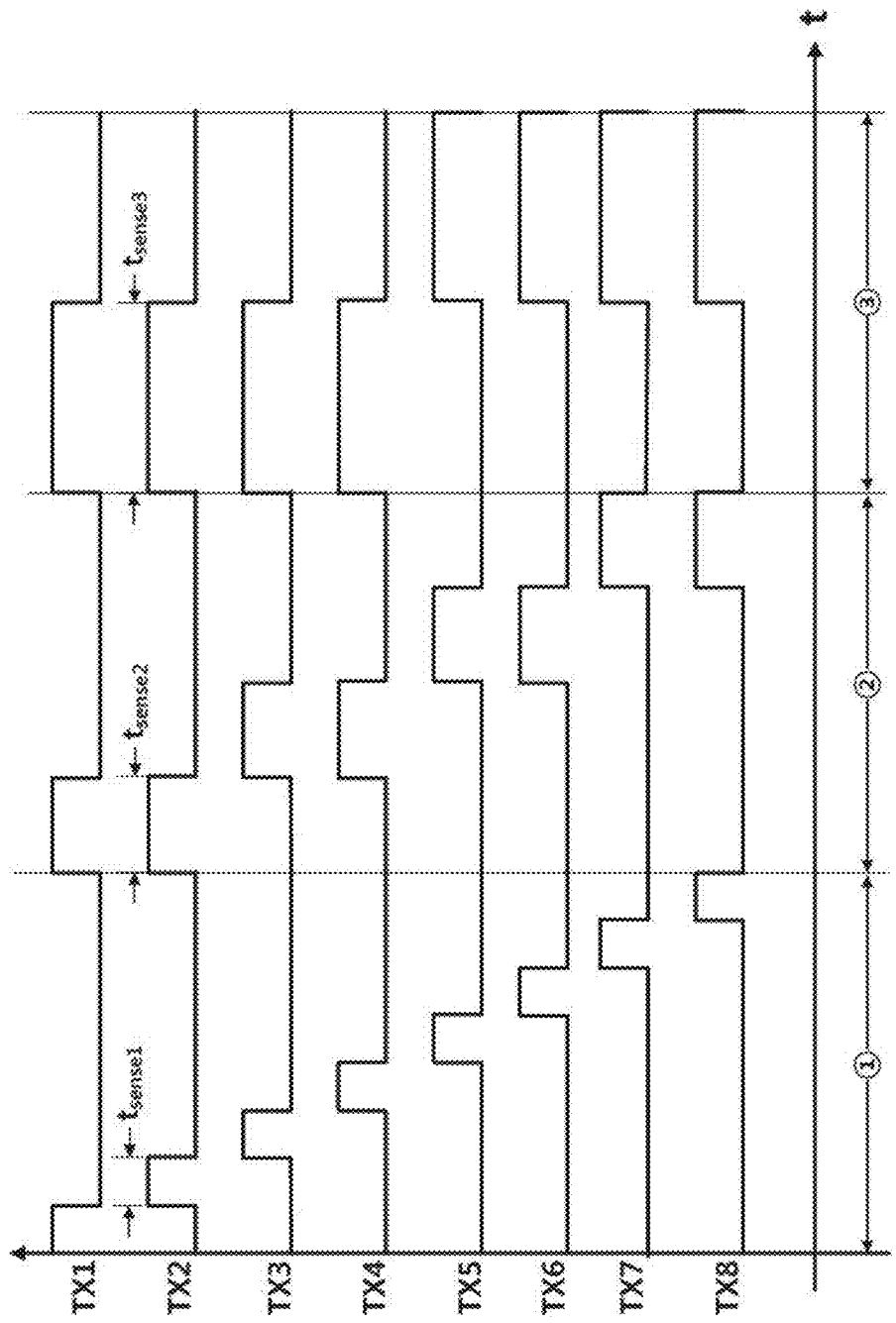
FIG. 7 is a timing diagram exemplifying period-specific changes of a driving signal provided to a capacitance-detection panel.

A driving method for a capacitance-detection device and operation of the capacitance-detection device according to the present embodiment will be described below with reference to FIGS. 6 and 7. FIG. 6 is a diagram exemplifying changes in the magnitude of a noise signal N detected by the noise-detection probe 300 over time in relation to a plurality of threshold values, and FIG. 7 is a timing diagram exemplifying period-specific changes of a driving signal provided to the capacitance-detection panel 100. In FIGS. 6 and 7, it is assumed that a capacitance-detection panel including eight driving electrodes is driven, and those of ordinary skill in the art may easily modify the present embodiment into a driving method of a capacitance-detection panel including a more or less number of driving electrodes.

Referring to FIGS. 6 and 7, the controller 226 receives the digitized noise signal N from the ADC 224 and compares the noise signal N with a plurality of threshold values. During period ①, a magnitude of the noise signal N is less than a first threshold value Th.1. When the noise signal N has a magnitude less than the first threshold value Th.1, it is possible to obtain a signal-to-noise ratio (SNR) required to distinguish a user input even if driving electrodes are sequentially driven. Therefore, the driving electrodes are sequentially driven.

However, when the magnitude of the noise signal N increases and exceeds the first threshold value Th.1 but is less than a second threshold value Th.2 as shown in period ②, it is not possible to obtain a sufficient SNR to distinguish a user input if the driving electrodes are sequentially driven like in period ①.

The controller 226 increases a sensing time $t_{sense2}$ in period ② to be longer than a sensing time $t_{sense1}$ in period ①. A touch signal generated by a touch is accumulated with an increase in sensing time such that a magnitude of the touch signal increases. However, since noise theoretically has an average amplitude value of 0, a magnitude of the noise signal does not increase with an increase in sensing time. Therefore, it is possible to obtain a sufficient SNR to distinguish a user input by increasing a sensing time. However, the controller 226 uniformly maintains an operating rate of the capacitance-detection panel by uniformly maintaining a time in which all the driving electrodes are driven. As an implementation example, the controller 226 may increase the sensing time $t_{sense2}$ in period ② to double the sensing time $t_{sense1}$ in period ① and simultaneously provide a driving signal to the first driving electrode Tx1 and the second driving electrode Tx2.

When the magnitude of the noise signal N further increases and exceeds the second threshold value Th.2, it is not possible to obtain a sufficient SNR by detecting a user input during the sensing time $t_{sense2}$ in period ②. Therefore, the controller 226 may increase a sensing time $t_{sense3}$ in period ③ to be longer than the sensing time $t_{sense2}$ in period ②. Also, the controller 226 uniformly maintains the operating rate of the capacitance-detection panel by uniformly maintaining the time in which all the driving electrodes are driven.

As an implementation example, the controller 226 may increase the sensing time $t_{sense3}$ in period ③ to double the sensing time $t_{sense2}$ in period ② and simultaneously drive the first driving electrode Tx1, the second driving electrode Tx2, the third driving electrode Tx3, and the fourth driving electrode Tx4. Subsequently, the controller 226 may simultaneously drive the fifth driving electrode Tx5, the sixth driving electrode Tx6, the seventh driving electrode Tx7, and the eighth driving electrode Tx8.

In the embodiment shown in FIGS. 6 and 7, two different threshold values are used to sequentially drive the driving electrodes, or the driving electrodes are classified into groups of two driving electrodes or groups of fourth driving electrodes, and the groups are sequentially driven.

However, according to an embodiment not shown in the drawings, a more number of threshold values are used to sequentially drive the driving electrodes, or the driving electrodes are classified into groups including two driving electrodes, groups including three driving electrodes, . . . , or a group including seven driving electrodes, and the groups are sequentially driven.

Simulation Example

Figure 8:
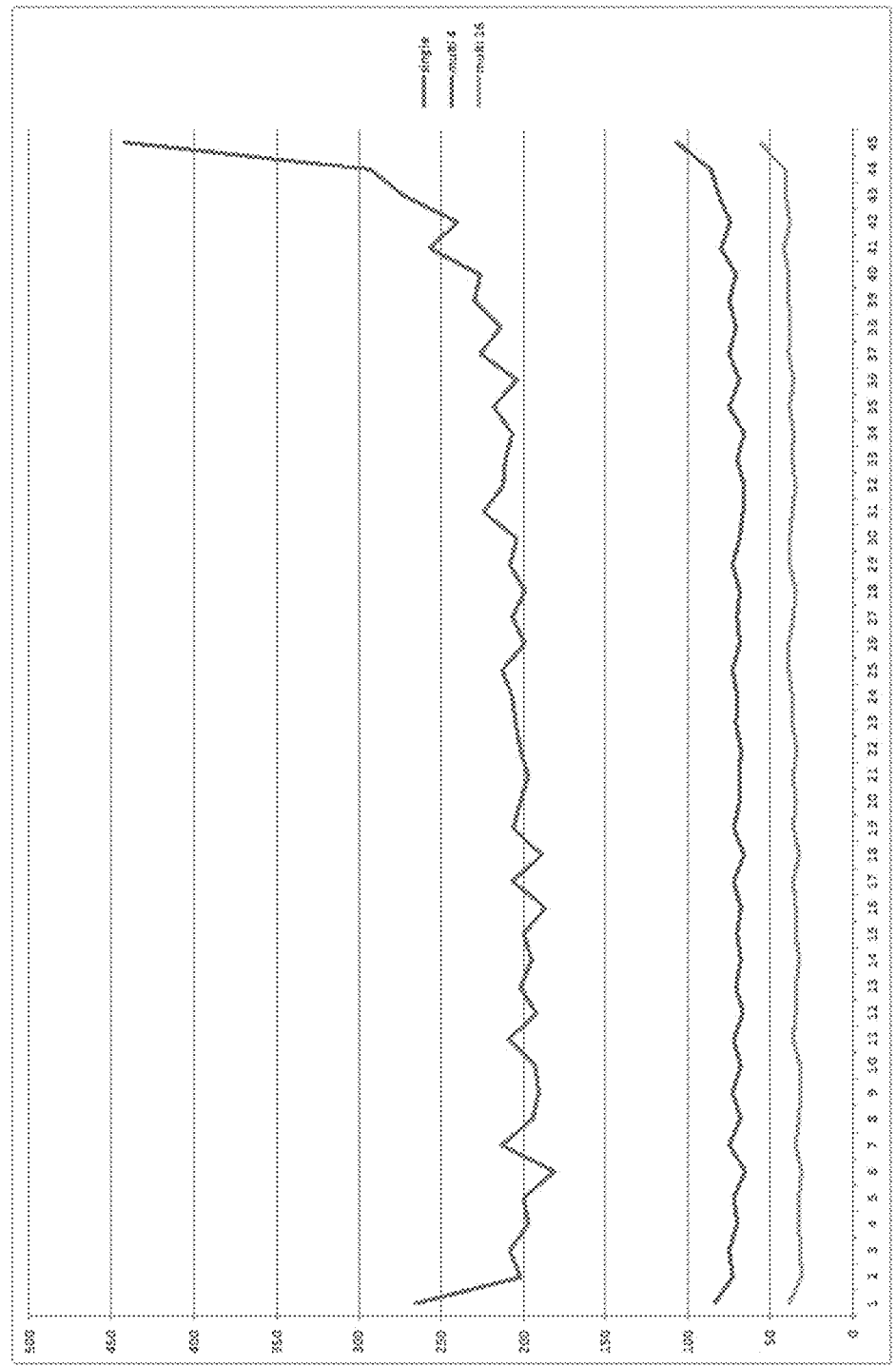
FIG. 8 is a diagram showing noise levels detected by a capacitance-detection device and a driving method of the capacitance-detection device according to the present embodiment.

FIG. 8 is a diagram showing noise levels detected by a capacitance-detection device and a driving method of the capacitance-detection device according to the present embodiment. Referring to FIG. 8 an upper solid line indicates a noise level detected by providing a driving signal to one driving electrode, a middle solid line indicates a noise level detected by sequentially providing a driving signal to four driving electrodes, and a lower solid line indicates a noise level detected by sequentially providing a driving signal to 16 driving electrodes.

When sensing is performed while four single driving electrodes are driven by simultaneously providing a driving signal to the four driving electrodes, it is possible to see that a noise signal is averaged out and the noise level is lowered. Also, when sensing is performed while 16 single driving electrodes are driven by simultaneously providing a driving signal to the 16 driving electrodes, it is possible to see that a noise signal is averaged out and the noise level is further lowered.

Consequently, according to the present embodiment, since it is possible to detect a user input by dynamically changing a sensing time according to a magnitude of a noise signal acquired by a noise-detection probe, a reduction in SNR can be prevented in spite of the inflow of noise.

According to the present embodiment, it is possible to reduce an influence of noise coming into a capacitance-detection device on detection of a user input such that the user input can be detected with high sensitivity and accuracy.

Although embodiments of the present invention have been described in detail above with reference to the accompanying drawings, the present invention is not limited to these embodiments and may be practiced in a variety of modified ways without departing from the technical spirit of the present invention. Therefore, the embodiments disclosed in the present invention are intended not to limit but to describe the technical scope of the present invention, and the scope of the technical spirit of the present invention is not limited by the embodiments. The embodiments set forth herein should be construed as not limiting. The scope of the present invention is disclosed in the following claims, and all technical spirits within the range of their equivalents shall be construed as being included in the scope of the present invention.

What is claimed is:

1. A driving method for a capacitance-detection device, the method comprising:
    (a) acquiring a noise signal;
    (b) comparing a magnitude of an acquired noise signal with a threshold value for driving the capacitance-detection device: and
    (c) adjusting a driving signal, provided to the capacitance-detection device to be driven, according to a result of said comparing; and
    wherein (a) comprises acquiring the noise signal using a noise-detection probe.
2. The driving method of claim 1, wherein the noise-detection probe is any one of (i) one electrode of a capacitance-detection panel and (ii) a pin connected to a driving circuit of the capacitance-detection device.
3. The driving method of claim 1, wherein (a) comprises:
    (a1) generating the noise signal corresponding to detected noise; and
    (a2) converting the noise signal into a digital signal.
4. The driving method of claim 1,
    wherein said comparing includes comparing the magnitude of the acquired noise signal with a plurality of threshold values.
5. The driving method of claim 1, further comprising increasing a number of simultaneously driven driving electrodes of the capacitance-detection device with an increase in the magnitude of the acquired noise signal.
6. The driving method of claim 1, further comprising increasing a sensing time of the capacitance-detection device with an increase in the magnitude of the acquired noise signal.
7. The driving method of claim 1,
    further comprising driving the capacitance-detection device at a driving speed that is not related to the magnitude of the acquired noise signal.
8. A capacitance-detection device comprising:
    a capacitance-detection panel including driving electrodes and sensing electrodes;
    a driving circuit configured to provide a driving signal to the driving electrodes and receive a capacitance-detection signal from the sensing electrodes; and
    a noise-detection probe configured to detect and provide noise to the driving circuit,
    wherein the driving circuit in operation adjusts the driving signal according to a magnitude of the noise detected by the noise-detection probe.
9. The capacitance-detection device of claim 8, wherein the noise-detection probe includes any one of one electrode among the driving electrodes and the sensing electrodes and a pin connected to the driving circuit.
10. The capacitance-detection device of claim 8, wherein the driving circuit comprises:
    an amplifier configured to generate a noise signal corresponding to the noise detected by the noise-detection probe; and
    an analog-to-digital converter (ADC) configured to convert the noise signal into a digital signal.
11. The capacitance-detection device of claim 10, wherein the driving circuit is configured to increase a number of simultaneously driven driving electrodes of the capacitance-detection device with an increase in a magnitude of the noise signal.
12. The capacitance-detection device of claim 10, wherein the driving circuit is configured to increase a number of driven driving electrodes of the capacitance-detection device with an increase in a magnitude of the noise signal.
13. The capacitance-detection device of claim 10, wherein the driving circuit is configured to increase a sensing time of the capacitance-detection device with an increase in a magnitude of the noise signal.

* * * * *